United States Patent [19]

Taylor et al.

[11] Patent Number: 4,619,690

[45] Date of Patent: Oct. 28, 1986

[54] CHROMITE ORE BENEFICIATION

[75] Inventors: Patrick R. Taylor, Moscow, Id.; Matthew A. Omofoma, Ile-Ife, Nigeria

[73] Assignee: Idaho Research Foundation, Inc., Moscow, Id.

[21] Appl. No.: 577,531

[22] Filed: Feb. 6, 1984 (Under 37 CFR 1.47)

[51] Int. Cl.$^4$ .......................... C01G 37/00; C22B 1/00
[52] U.S. Cl. ...................................... 75/1 R; 423/53; 423/242; 423/244
[58] Field of Search ............... 423/53, 57, 213.2, 242, 423/244; 75/1 R

[56] References Cited

U.S. PATENT DOCUMENTS 4,464,344  8/1984  Saikkonen ..................... 75/1 R X

FOREIGN PATENT DOCUMENTS 109992  3/1976  Japan .................................. 423/555

OTHER PUBLICATIONS

"Chemical Upgrading of Stillwater Chromite" Dwight L. Harris, Transactions of Society of Mining Engineers, Sep. 1964, pp. 267–281.
DeMatos and Peres Abstract.
"A Review of the Deposits and Beneficiation of Lower-grade Chromite", Ralph H. Nafziger, Journal of South African Institute of Mining and Metallurgy, Aug. 1982, pp. 250–226.
"The Role of Alkali Sulphates in Promoting the Sulphation Roasting of Nickel Sulphides", A. W. Fletcher and M. Shelef, *Unit Processes in Hydrometallurgy*, Milton E. Wadsworth and Franklin T. Davis, editors, Metallurgical Society Conferences, vol. 24, pp. 946–970.

*Primary Examiner*—H. T. Carter
*Attorney, Agent, or Firm*—Wells, St. John & Roberts

[57] ABSTRACT

Disclosed is a process for beneficiating chromite ore. The process can also be used to remove $SO_2$ from $SO_2$-air mixtures which would ordinarily be vented. The chromite ore is pulverized and preferably mixed with sodium sulfate. Ammonium carbonate can also be added for subsequent vaporization to increase porosity. Sulphur oxide-oxygen roasting of the chromite ore is conducted at elevated temperatures in the approximate range between 300° and 1,000° C. or higher at approximately atmospheric pressures. After roasting, the ore is preferably leached using an aqueous ferric sulfate solution to remove soluble undesired constituents from the roasted chromite ore. The beneficiated chromite ore shows improved chromium concentrations and chromium to iron ratios when compared to the original ore.

13 Claims, 5 Drawing Figures

EXTENT OF REACTION AS A FUNCTION OF VARIOUS TEMPERATURES

EXTENT OF REACTION AS A FUNCTION OF TIME FOR VARIOUS $SO_2$ PARTIAL PRESSURES

EXTENT OF REACTION AS A FUNCTION OF TIME FOR VARIOUS CHROMITE TO SODIUM SULFATE RATIOS BY WEIGHT

EXTENT OF REACTION AS A FUNCTION OF TIME FOR VARIOUS GRAIN SIZES

EXTENT OF REACTION AS A FUNCTION OF TIME FOR VARIOUS INITIAL POROSITIES OF THE PELLET

CHROMITE ORE BENEFICIATION

TECHNICAL FIELD

The technical field of this invention includes methods for improving or upgrading chromite ore for manufacture into ferro-chromium alloys or chromium metal, and methods for removing $SO_2$ from waste gas streams.

BACKGROUND OF THE INVENTION

The element chromium is an important and strategic metal in our modern society. It is used extensively in the production of stainless steels and other corrosion resistant applications such as chrome plating. Chromium is also used extensively in the chemical industry in producing chromium containing compounds for a variety of uses including leather tanning and paint pigments. Chromium in the form of chromite is used in the production of refractory bricks for lining high temperature furnaces and in the glassmaking and cement industries.

Chromium is usually derived from chromite ore which includes chromite, $FeCr_2O_4$, as a primary constituent. Chromite ores typically include other oxides such as silicon dioxide, $SiO_2$, magnesium oxide, $MgO$, and aluminum oxide, $Al_2O_3$. Other oxides may also be present in varying quantities depending upon the specific chromite deposits in question.

Chromite ores are typically classified on the basis of their chromium to iron ratio, Cr/Fe ratio, and the concentration of chromium in the ore. The highest grade of chromites are those having chromium to iron ratios of greater than 2.0 and having a minimum of 46% to 48% $Cr_2O_3$. This highest grade of chromites are typically referred to as metallurgical grade chromites. They occur in significant quantities in South Africa, Zimbabwe, and the USSR.

The next grade of chromite ores are typically called chemical and refractory grade chromites which usually have concentrations of $Cr_2O_3$ in the range of 40 to 46 percent. Chromium to iron ratios typically range from 1.4 to 2.0 although chemical grade chromite ores sometimes contain large amounts of iron which can result in chromium to iron ratios as low as 1.0. Refractory grade chromites contain relatively large quantities of aluminum oxide $Al_2O_3$.

Low grade chromites are those having chromite to iron ratios of less than approximately 1 and containing less than 40 percent $Cr_2O_3$.

The United States does not have developed deposits of high grade chromite ore. Most of the chromite deposits in the U.S. are of relatively low grade and hence are currently uneconomical for use in producing chromium metal, higher grades of chromite, or ferrochromium compounds used in the steel industry. The United States does have very significant deposits of relatively low grade chromite ores in coastal beach sands of southwest Oregon, the Stillwater complex of southcentral Montana, California, and Alaska. These low grade deposits have not been commercially developed because higher grade ores from foreign countries can be more economically refined. Because of the strategic importance of chromium and the large amount consumed by the U.S., it is apparent that a relatively cost effective method for upgrading or beneficiating these lower grade domestic ores is much desired.

Prior art processes have attempted to beneficiate these low grade chromite ores using a number of techniques. Oregon beach sand deposits of chromite have been gravity concentrated by tabling or by the use of Humphreys spirals. Flotation techniques have also been tried but have not been widely used due to low recoveries.

Work by the U.S. Bureau of Mines explored roasting chromite ores under strongly reducing conditions with carbon at temperatures near 1300° C. This roasting process reduced the iron in the chromite ore which was then dissolved in dilute sulfuric acid with most of the chromium remaining because of its relative insolubility in the sulfuric acid solution.

Reduction of chromite ores using graphite have also been tested at temperatures in the approximate range of 1150° to 1450° C. Coal char was also used in lieu of graphite as the reductant. Smelting of chromite ores with subbituminous coal and char have also been tried.

Other reducing gases such as hydrogen, methane, natural gas, and carbon monoxide have been used to reduce the iron in chromite ores usually by roasting at elevated temperatures. Leaching of the resulted roasted ore using sulfuric acid at atmospheric pressures has also been tested.

Tests involving sulfating roasting and leaching with ammonium sulfate have been tried but not considered economical due to excessive losses of ammonia and a required crystallization of alum to separate iron from the chromium.

The closest prior art experimentation known was conducted by Dwight L. Harris and reported in the Transactions of the Society of Mining Engineers, September 1964 at pp. 267-281. The Harris study investigated many different reduction and leaching processes using carbon, chlorine, ammonium and sulfation reduction steps. Reduction with gaseous $SO_2$ and $SO_3$ in combination with air and in concentrations ranging from 10 to 50% sulfur oxides were conducted. The sulfation roasting of the chromite ores occurred at temperatures ranging between 900° to 1340° F. for roasting periods of approximately three to four hours. The chromite subjected to the sulfating roasts were subsequently leached in a solution of water with 5% by weight sulfuric acid. Harris concluded that sulfation roasting with sulfuric acid leaching was not economical. Harris also experimented with using ferric sulfate leaching of chromite ore concentrate which had previously been reduction roasted with coal.

It is the object of this invention to not only beneficiate low grade chromite ores using sulfur dioxide and air mixtures, but to also scrub sulfur dioxide from waste gases which are produced in great volume by many industrial processes and which are ordinarily vented. In many instances, the concentrations of $SO_2$ which are emitted through such vents must necessarily be reduced in order to comply with environmental laws. Thus it appears that economic savings are possible by performing both functions simultaneously.

It is also an object of this invention to leach reacted chromite ores to thereby remove iron, magnesium, and other impurities from the ore to increase the chromium to iron ratio and the concentration of chromium in the resulting product.

BRIEF DESCRIPTION OF THE DRAWINGS

FIG. 1 shows the effect of varying reaction temperatures;

FIG. 2 shows the effect of varying SO$_2$ partial pressures;

FIG. 3 shows the effect of varying additions of sodium sulfate;

FIG. 4 shows the effect of varying grain sizes; and

FIG. 5 shows the effect of varying porosities.

DETAILED DESCRIPTION OF THE PREFERRED EMBODIMENTS

Figure 1:
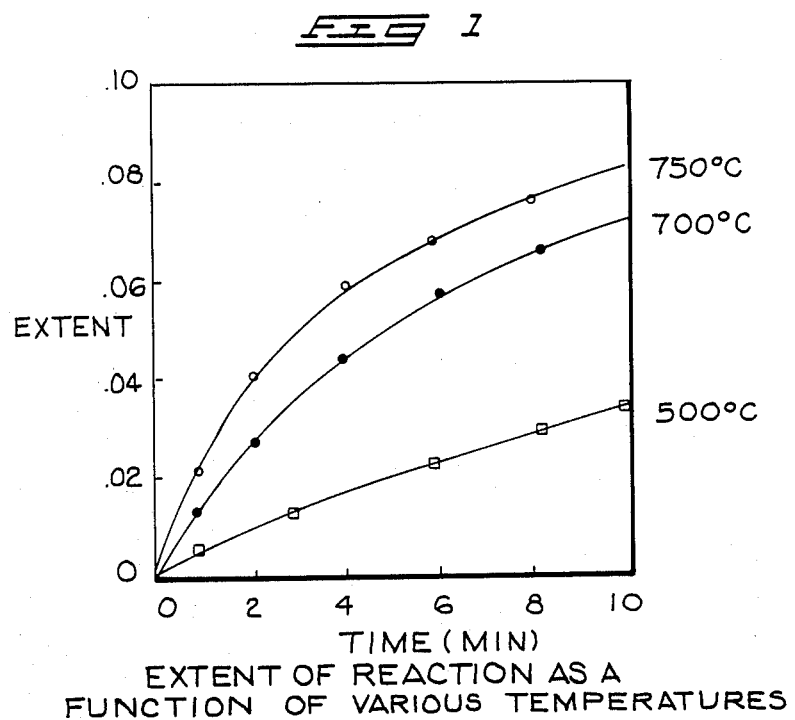
FIGS. 1-5 show experimental data concerning the rate of reaction (extent of reaction as a function of time) of chromite ores in a $SO_2$ and air containing gas stream.

In compliance with the constitutional purpose of the Patent Laws "to promote the progress of science and useful arts" (Article 1, Section 8), applicant submits the following disclosure of the invention.

The current invention involves improved methods for beneficiating chromite ores. The beneficiation methods are also advantageously used to remove sulfur oxides from stack gases to improve the economics of the processes by performing pollution abatement and chromite beneficiation simultaneously.

The benefication process of this invention involve at least three basic steps. The first is proper preparation of the chromite ore. The second step is a sulfur and oxygen roasting of the prepared ore using a gaseous mixture containing both sulfur dioxide or sulfur trioxide and oxygen at elevated temperatures. The third step involves leaching of the sulfur and oxygen roasted chromite ore to remove impurities using an aqueous ferric sulfate solution. Each of these principal or basic steps will be more fully considered below after first considering the makeup of chromite ores.

The chromite bearing ores of the U.S. and other areas typically contain varying amounts of iron (Fe), as Fe$_2$O$_3$ or FeO; chromium oxides, usually Cr$_2$O$_3$, and oxides of magnesium (MgO), silicon (SiO$_2$), and aluminium (Al$_2$O$_3$). In some cases other impurities such as calcium oxide (CaO) are also present in significant quantities. The exact constituents of a particular ore will effect the processing of that ore but in general the present invention is believed effective at increasing the concentration of chromium and the ratio of chromium to iron for a wide range of chromite ore types.

The principal reactions involved in the sulfur and oxygen roasting step are believed to be:

$$FeCr_2O_4(s) + SO_2(g) = FeS(s) + Cr_2O_3(s) + 3/2 O_2(g) \quad (1)$$

$$MgO(s) + SO_2(g) + \tfrac{1}{2} O_2(g) = Mg(SO_4)(s) \quad (2)$$

Other reactions which may be occurring during the roast include:

$$FeO + SO_2 = FeS + 3/2 O_2 \quad (3)$$

$$MgO + SO_2 = MgS + 3/2 O_2 \quad (4)$$

$$Al_2O_3 + 3SO_2 + 3/2 O_2 = Al_2(SO_4)_3 \quad (5)$$

$$CaO + SO_2 + \tfrac{1}{2} O_2 = CaSO_4 \quad (6)$$

The sulfur-oxygen roast of the chromite ore creates iron and magnesium compounds which are soluble in the aqueous ferric sulfate solution. The Cr$_2$O$_3$ and other chromium bearing compounds formed or remaining after roasting are typically not as soluble in the ferric sulfate solution, hence allowing the overall chromium concentration of the resulting residue to be increased.

The sulfur-oxygen roasting is preferably carried out under atmospheric or near-atmospheric pressures because of the reduced cost when compared to pressurized reactors and equipment needed in pressurizing the gaseous reactants. Experimentation has not been conducted under pressurized conditions although the process is believed to be operable thereunder but not as economical.

The temperatures for carrying out the sulfur-oxygen roast are preferably approximately in the range between 300° and 1000° C. The preferred temperature is approximately 750° C. FIG. 1 shows experimental results of extent of reaction version time for several roasting temperatures. Extent of reaction for the purposes used herein is defined as the change (decrease) in the weight of the chromite ore divided by the theoretical weight change expected due to the reactions represented by equations (1) and (2) given above.

The sulfidation and sulfation reaction of the chromite ore must be carried out in the presence of both sulfur dioxide, SO$_2$, and oxygen, O$_2$. Sulfur trioxide, SO$_3$ is believed to be a partial or whole substitute for SO$_2$ but is not as commercially prevalent. The preferred partial pressure of SO$_2$ has been found to be approximately 0.57 atmospheres. The corresponding preferred partial pressure of O$_2$ is approximately 0.09 atmospheres. Both with respect to a total pressure of approximately 1 atmosphere. The remaining gaseous constituents being nitrogen, N$_2$, and the remaining constituents of air or the waste gas stream supplying the SO$_2$.

The relative concentrations or partial pressures of gaseous SO$_2$ and O$_2$ have been found to be a significant parameter in making the process effective. The rate of reaction of chromite ore during the sulfur-oxygen roast has been found more sensitive to variations in the partial pressure of SO$_2$ than to the partial pressure of O$_2$. The initial rate of reaction appears to nearly double when the ratio of the partial pressure of SO$_2$ over the partial pressure of O$_2$ increases from 1 to 6. The preferred ratio is approximately 6. The increased rate of reaction associated with the proper SO$_2$ and O$_2$ partial pressures reduces the necessary roasting time which in turn reduces the amount of processing equipment necessary for a given throughput of chromite ore. Increasing the ratio of SO$_2$ partial pressure over O$_2$ partial pressure beyond 6 decreases the intial rate of reaction.

Figure 2:
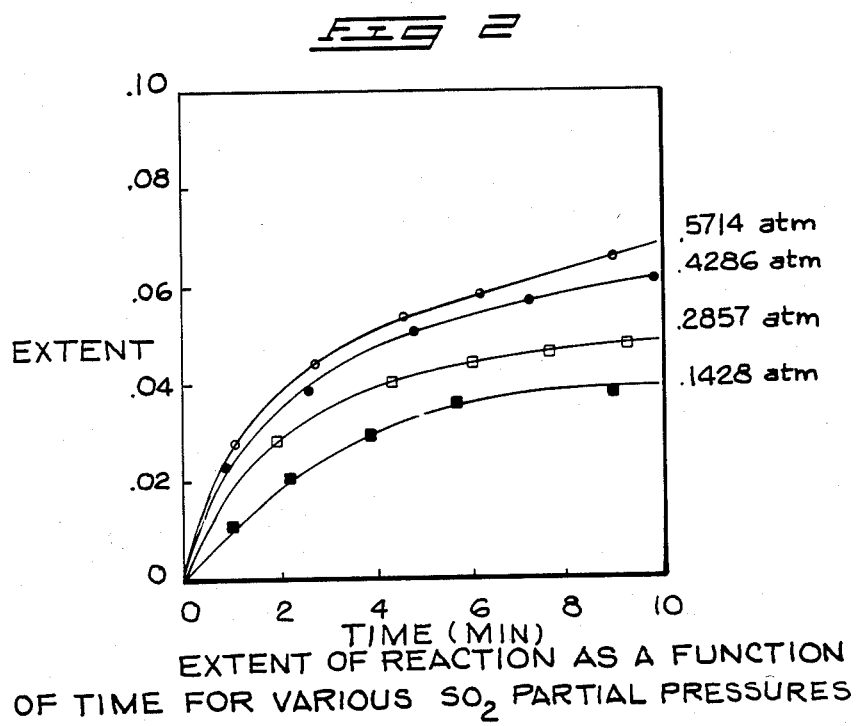

The extent of reaction is a function of time as well as other parameters discussed herein. Roasting of Stillwater complex chromite ores has indicated that times in the range of approximately 10 minutes–60 minutes will under the preferred process parameter ranges discussed herein cause the roast reactions to reach an extent measurement of approximately 60–80%. Experimental data showing the extent of reaction versus time for varying partial pressures of SO$_2$ are shown in FIG. 2.

The current invention also includes the discovery that the rate of reaction during sulfur-oxygen roasting and the overall extent of reaction can be improved by mixing sodium sulfate, Na$_2$SO$_4$, with the chromite ore prior to roasting. The mechanism through which the sodium sulfate improves the rate of the roasting reactions is not fully understood but significant improvements are clearly evident. One theory as to the mode of operation of sodium sulfate is that it reacts with SO$_2$ to form sodium pyrosulfate, Na$_2$S$_2$O$_7$, which then acts as a local source for SO$_2$ and O$_2$ at the reaction interface upon decomposition during roasting.

Figure 3:
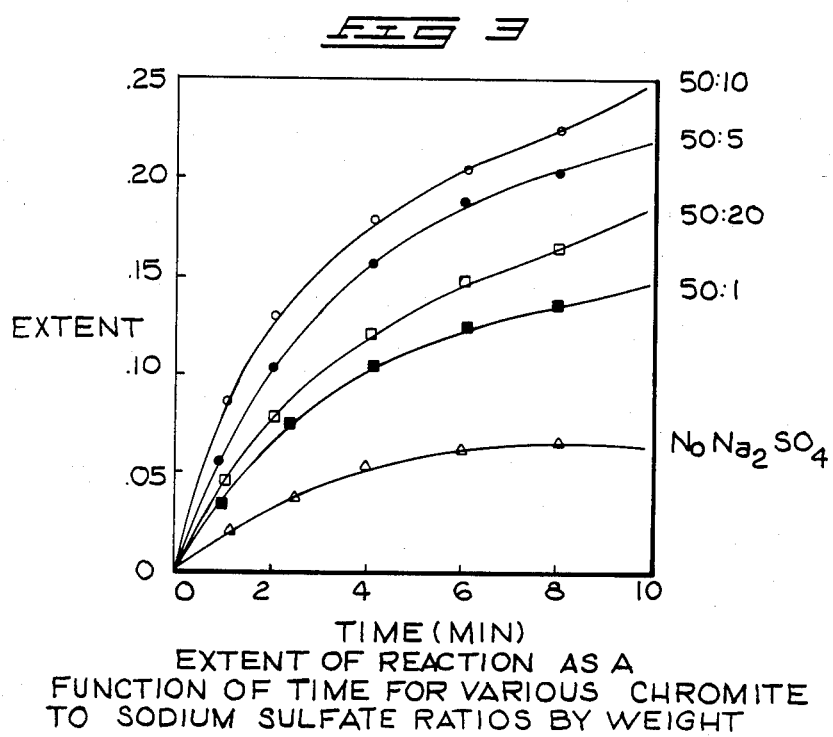

FIG. 3 shows experimental data exemplary of how the relative amounts of chromite to sodium sulfate affected the extent of reaction over the initial period of roasting. FIG. 3 shows that the maximum extent of reaction occurred when the chromite ore and sodium sulfate where blended in a ratio of 50:10 (5:1). Increasing the concentration of sodium sulfate to 50:20 decreased the reaction rate. Lower concentrations of sodium sulfate also had lower reaction rates when compared to the 50:10 ratio. The lowest rates found within the range tested where associated with no sodium sulfate addition.

It is believed that other alkali metal sulfates may also have a beneficial effect upon chromite ore when combined prior to roasting in $SO_2$ and air ($O_2$). The group of sulfates contemplated includes: potassium, sulfate, $K_2SO_4$; lithium sulfate $Li_2SO_4$; rubidium sulfate, $Rb_2SO_4$; cesium sulfate ($Ce_2SO_4$); and francium sulfate, $Fr_2SO_4$. The cost of sodium sulfate is substantially less than the remaining members of this group and hence appears to be the most important member commercially. Experimentation has not been conducted to verify the suitability of these compounds as additives for sulfur and oxygen roasting of chromite ores.

It has also been determined that the rate of flow of the reactant gases $SO_2$ and air over the chromite ore does have significant effect on the rate of reaction during the roast step. The rate of flow of the reactant gases over the ore improves the roasting reaction rates until a plateau is reached after which no further increase in reaction rate can be obtained. The following examples explain the specific flow rates under particular conditions.

The rate at which the roasting reactions occur is also effected by the porosity and grain size of the chromite ore when roasted. To enhance the reaction kinetics it is desirable to grind or pulverize the raw chromite ore to increase the available surface area. The grain size of the ground chromite ore is inversely related to the rate of reaction during roasting. Grain sizes ranges between $-325$ mesh to $-80$ mesh have been found acceptable with the smaller grain sizes having progressively greater rates of reaction.

Figure 4:
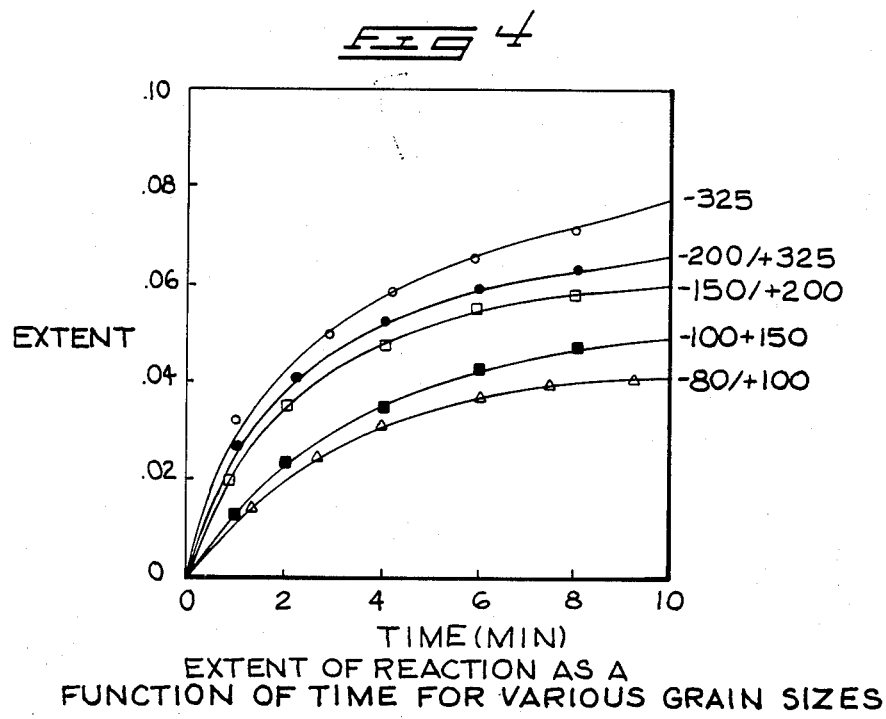

FIG. 4 is exemplary of experimental results indicating the effect of grain size of the chromite ore upon the extent of reaction versus time.

Ore ground into small grain sizes are difficult to control because of their dusty nature. Therefore it is preferable that the ground ore be pelletized, agglomerated or otherwise accumulated into relatively porous but mechanically sound units. The pellets or agglomerations can be of a variety of sizes with cylindrical or spherical pellets having diametrical sizes in the range of $\frac{1}{3}-\frac{1}{2}$ inch (9-13 mm) being preferred.

The pelletization of ground chromite ore using a compression pelletizer can substantially reduce the porosity of the resulting pellets so that they do not react as quickly as desired. It is therefore desirable to increase the porosity of the pellets. One method for increasing the porosity of the pellets involves adding ammonium carbonate into the ground chromite ore prior to compressing it into pellets. The resulting mixture is then compressed into pellets with with the ammonium carbonate dispersed throughout the matrix of chromite ore grains. The pellets are then preferably fired at approximately 700° C. for six hours to vaporize the ammonium carbonate causing it to diffuse from the pellets to thereby form pores in the pellets. The firing of the pellets also increases their mechanical strength. Other methods for maintaining porosity of pellets will be apparent to those skilled in the art.

Figure 5:
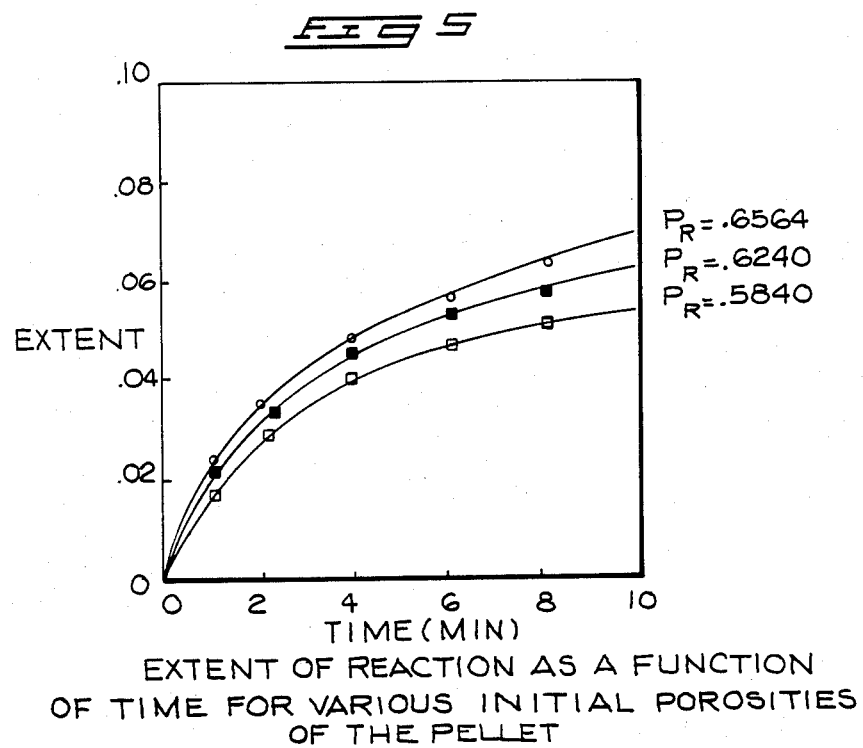

FIG. 5 indicates that porosities ranging between 0.5840 and 0.6564 have been tested. The higher the porosity the faster the reactions occurred during roasting. Porosity was defined as the ratio of the actual pellet density divided by the density of the chromite ore.

After the prepared chromite ore and any combined additives are roasted then they are preferably subjected to an aqueous ferric sulfate, $Fe_2(SO_4)_3$, solution leaching step to remove soluble compounds. Soluble compounds include iron sulfate, FeS; magnesium sulfate $MgSO_4$; and possibly others.

The ferric sulfate solutions are preferably comprised of 10-20 grams of ferric sulfate per liter of water. Ferric sulfate solutions having ferric sulfate concentrations in the range 0-20 grams per liter or higher are operable for leaching of chromite ore roasted according to this invention. Performance of low concentrations, less than 5 grams per liter, is not believed commercially satisfactory because of long leach times. Where leach time is not a limitation then lower concentration solutions may be desirable.

The pH of the aqueous ferric sulfate solutions are preferably adjusted using sulfuric acid, $H_2SO_4$, to produce pH values in the range from $-0.2$ to $+4.0$. The preferred pH is as low as possible with pH of 0 or less being preferred for minimizing the required leach time.

The temperature of the ferric sulfate leach solutions can range from 0° C. up to the boiling points of the aqueous ferric sulfate solutions near 100° C. The temperature of the leach does effect the rate of leaching with increased rates being associated with generally higher temperatures.

The roasted chromite ore mixtures are preferably added to the ferric sulfate leach solutions in sufficient amounts to create mixtures having solids comprising 20-50% (by weight) of the resulting solid-liquid mixture.

The leach of the roasted chromite ore is time dependent. The optimal period for leaching depends on the economic values of increasing the chromium to iron ratio and of the improved chromium concentration of the resulting leach residue. Periods ranging from several hours to 24 hours or longer are usually required to remove substantial portions of the soluble sulfates and sulfides formed during roasting. Recycling of the ferric sulfate solution may also be an option available which may affect the period and particular process parameters of the leach. Temperature of the leach solution also effects the optimal time for leaching.

Average test results of beneficiation using the method of this invention indicated that chromium to iron ratios can be increased from approximately 0.9 to 1.1. Concentration of the chromium was increased from approximately 9% to 15%.

EXAMPLE 1—EXPERIMENTAL PROCEDURE

Chromite ore from the Stillwater complex in Montana was obtained and pulverized. The pulverized chromite ore was analyzed to determine the constituents of the ore which are shown in Table 1. Also shown in Table 1 is the chromium to iron ratio.

TABLE 1

| Contents | Percent |
| --- | --- |
| $Cr_2O_3$ | 20.4 |
| Fe | 12.2 |
| $SiO_2$ | 21.0 |
| MgO | 17.0 |

TABLE 1-continued

| Contents | Percent |
|---|---|
| Al$_2$O$_3$ | 11.6 |
| Cr:Fe ratio | 1:1.14 |

The sizes of grains contained in the pulverized sample ranged from −80 mesh to −325 mesh. Grain sizes were graded to allow that parameter to be explored. Sizes were graded into the following classes, all given in mesh sizes: −80/+100; −100/+150; −150/+200; −200/+325; −325. The relative concentrations of the above constituents varied between the size graded samples.

Analyzed grade ammonium carbonate, NH$_4$CO$_3$, was added to some samples of pulverized chromite ore in an amount equal to 10% by weight.

Sodium sulfate, Na$_2$SO$_4$, was also added in varying amounts ranging from none to 20 parts by Na$_2$SO$_4$ per 50 parts chromite ore (by weight).

The pulverized chromite ore and any additions were pressed into cylindrical pellets having an approximately 1.5 centimeter diameter using axial pressure in the range of 20,000–30,000 pounds per square inch. The pellets were then heated to 700° C. for six hours to increase impact strength and to drive off the ammonium carbonate thereby increasing the porosity of the pellets. The size of the pores approximated the grain size of the ammonium carbonate used. The cylindrical pellets were then shaped into spheres.

The resulting pellets were placed into a thermogravimetric apparatus. The apparatus included a reactor and electrobalance used to measure weight loss of the pellets during reaction. The reactor was connected to sources of compressed SO$_2$ and air. A furnace surrounded the reactor to provide the heat necessary to increase the roasting temperature.

The furnace was first brought to the desired temperature range and then the flow of air and SO$_2$ was commenced about the pellets. Gas flow rates were tested and it was determined that a combined flow rate of 7000 cubic centimeters per minute or more over a single pellet produced a maximum rate of reaction which did not appreciably increase for higher flow rates.

The pellet weights were recorded over time as the increased temperature and flow of SO$_2$ and air caused the sulfur-oxygen roasting to occur. A large number of different tests were run to explore the parameters discussed above. FIGS. 1, 2, 3, 4 and 5 exemplify the results of such tests.

SPECIFIC EXAMPLE 1A

The chromite ore was prepared as discussed above under Experimental Procedure with no sodium sulfate added. Ammonium carbonate was added in an amount sufficient to equal 10% of the 2.80 g total pellet weight. The pellet grains being in the size range −150/+200 mesh. The spherical pellet was placed in the reactor and heated to 800° C. Flow of SO$_2$ and air was commenced and quickly stabilized at 7000 cc/min. with the partial pressure of SO$_2$ being 0.43 atmospheres and the remainder being air. Pellet weight measurements were continuously recorded and from the weights it was determined that after a period of 10 minutes the extent of the reaction had reached 0.061. The extent of reaction being calculated as specified above.

SPECIFIC EXAMPLE 1B

The chromite ore was prepared as discussed in Example 1 with the grain size of the chromite in the range −200/+325 mesh. No ammonium carbonate was added and sodium sulfate was added in the ratio of 50:10 (chromite to Na$_2$SO$_4$). The reactor temperature was brought to 800° C. The gas flow was set at 4000 cc/mm SO$_2$ and 3000 cc/mm air. After 10 minutes the pellet had undergone reaction to the extent of 0.24.

EXAMPLE 2

Chromite ore pellets were prepared and roasted in a procedure similar to that described for Example 1A but at a temperature of 800° C. for 10 minutes. The pellets were subsequently cooled and placed in an aqueous ferric sulfate solution having a ferric sulfate concentration of 19 grams per liter of water. The pH of the solution ranged from 0 to 1 as a result of adjustment thereof using sulfuric acid.

Thirty-five grams of reacted chromite pellets were placed into 300 milliliters of the solution. The solution was held at a temperature in the range 50°–60° C. for a period of 24 hours. The leach residue showed a loss of 19.5% of the iron and the chromium to iron ratio was increased from 0.933 in the initial sample to 1.158 in the residue.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A process for beneficiating chromite ores, comprising:
   reacting chromite ore with at least one sulfur oxide selected from the group consisting of sulfur dioxide and sulfur trioxide and oxygen by passing a gaseous stream including a sulfur oxide and oxygen about the chromite ore at temperatures in the range of approximately 300°–1000° C. or higher; and
   leaching reacted chromite ore by placing the reacted ore in a leach solution comprising an aqueous ferric sulfate solution having a concentration thereof in the range greater than approximately 5 grams per liter of solution; and having a pH of less than approximately +4.0 as adjusted by adding sulfuric acid to the solution, for a sufficient period of time to allow soluble constituents of the ore to be dissolved into the leach solution to thereby improve the chromium to iron ratio and the concentration of chromium in the residual ore.

2. The process of claim 1 further defined by having the leaching step performed in the temperature range of approximately 0°–100° C.

3. The process of claim 1 wherein the reacting step is carried out at temperatures in the range of approximately 500°–800° C.

4. The process of claim 1 further comprising the step of preparing the chromite ore prior to the reacting step, by pulverizing the ore.

5. The process of claim 4 further comprising the step of pelletizing the pulverized chromite ore prior to the reacting step.

6. The process of claim 4 further comprising the step of mixing an alkali metal sulfate into the pulverized ore prior to the reacting step.

7. The process of claim 4 further comprising the step of mixing sodium sulfate ($Na_2SO_4$) into the pulverized ore prior to the reacting step.

8. The process of claim 4 further comprising the step of agglomerating the pulverized ore into pellets prior to the reacting step.

9. The process of claim 5 further comprising the step of adding sodium sulfate ($Na_2SO_4$) to the pulverized ore prior to the step of pelletizing.

10. The process of claim 5 further comprising the steps of adding ammonium carbonate to the pulverized chromite ore prior to pelletizing and heating pellets of ore and ammonium carbonate to create pores in the pellets when the ammonium carbonate is thereby vaporized and driven from the pellets.

11. The process of claim 1 wherein the reacting step is carried out at temperatures in the range of 300° C.-1000° C.

12. A process for beneficiating chromite ores, comprising:
    pulverizing the chromite ore into grains;
    mixing the chromite ore grains with pulverized sodium sulfate;
    forming the mixture of chromite ore and sodium sulfate into chromite accumulations;
    reacting the chromite accumulations with a gaseous stream containing sulfur dioxide and oxygen at a reaction temperature of the approximate range of 300°-1000° C. under approximately atmospheric pressures;
    leaching the reacted chromite accumulations by placing the reacted accumulations in a leach solution comprising an aqueous ferric sulfate solution having a concentration thereof in the range greater than 5 grams per liter of solution and having a pH of less than +4.0, the chromite accumulations being leached for a sufficient period of time to allow iron, magnesium and other undesired constituents of the ore to be dissolved into the leach solution to thereby improve the chromium to iron ratio and to increase the concentration of chromium in the residual chromite.

13. A process for removing sulfur oxides from waste gas streams containing oxygen and sulfur oxides, and for simultaneously beneficiating chromite ores, comprising:
    passing a gas stream containing at least one sulfur oxide selected from the group consisting of sulfur dioxide and sulfur trioxide, and oxygen over prepared chromite ore at temperatures in the range of approximately 300° C.-1000° C. or higher to react the chromite with the sulfur oxides and oxygen thereby removing portions of the sulfur oxides from the gas stream and reacting the chromite ore therewith; and
    leaching chromite ore reacted with the sulfur oxide and oxygen containing gas stream, using an aqueous ferric sulfate solution having a concentration thereof in the range greater than approximately 5 grams per liter of solution and having a pH of less than approximately +4.0 to thereby solubilize compounds formed during passage of the sulfur oxide and oxygen containing gas stream over the prepared chromite ore, and thus beneficiate the residual chromite.

* * * * *